United States Patent
Hutson et al.

(10) Patent No.: US 8,070,064 B1
(45) Date of Patent: Dec. 6, 2011

(54) HAND-OPERATED DOCUMENT READER/IMAGER WITH SPEED LIMITING DEVICE PROVIDING DOCUMENT RETENTION

(75) Inventors: Sammy C. Hutson, Novi, MI (US); John C Gudenburr, Canton, MI (US); Michael J. Moore, Beverly Hills, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 998 days.

(21) Appl. No.: 11/949,839

(22) Filed: Dec. 4, 2007

(51) Int. Cl.
*G06K 7/08* (2006.01)

(52) U.S. Cl. .......................... 235/449; 235/454; 235/379

(58) Field of Classification Search .................. 235/379, 235/443, 446, 436, 449, 454, 472.01, 472.03, 235/482, 485, 486; 705/39; 358/472
See application file for complete search history.

(56) References Cited

U.S. PATENT DOCUMENTS

| | | | | |
|---|---|---|---|---|
| 5,256,863 A | * | 10/1993 | Ferguson et al. | 705/21 |
| 5,519,511 A | * | 5/1996 | Tanahashi | 358/473 |
| 2008/0130070 A1 | * | 6/2008 | Walker et al. | 358/496 |

* cited by examiner

*Primary Examiner* — Daniel Hess
*Assistant Examiner* — Tabitha Chedekel
(74) *Attorney, Agent, or Firm* — Honigman Miller Schwartz and Cohn LLP (57) ABSTRACT

A hand-operated document processor includes a base for receiving a document containing magnetic ink character data to be read and recognized. A manually operated moving magnetic ink character recognition (MICR) subsystem includes a MICR read head and is attached to the base. Movement of the subsystem causes the MICR read head to pass over the magnetic ink character data on the document. MICR reading and recognition logic receives the signal from the MICR read head. A spring drives the moving MICR subsystem across the document being processed. A vacuum solenoid creates a vacuum. The vacuum solenoid is driven by the spring and is connected to the base. The created vacuum acts as a brake to control the speed of the moving MICR subsystem as the moving MICR subsystem is driven by the spring.

20 Claims, 6 Drawing Sheets

HAND-OPERATED DOCUMENT READER/IMAGER WITH SPEED LIMITING DEVICE PROVIDING DOCUMENT RETENTION

BACKGROUND OF THE INVENTION

1. Field of the Invention

The invention relates to document processing, document imaging, and magnetic ink character recognition. The invention further relates to hand-operated document readers/imagers, and to methods and systems for providing controlled and repeatable motion in a non-motorized system as well as restraining a document during processing with a hand-operated document reader/imager to avoid document skew.

2. Background Art

A typical document processing system includes a feeder and a separator in the document-feeding portion of the system, and a series of roller pairs or belts in the document-transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms.

In addition to large document processing systems that handle stacks of documents, smaller systems also exist. These smaller document processing systems may handle smaller stacks of documents, or may even handle single documents, fed one at a time. There are also hand-operated document readers/imagers.

Banks, credit unions, and other financial institutions use document processing systems to regularly process checks, deposit slips, and other types of bank documents in order to execute financial transactions efficiently. Document processing systems have therefore become quite prevalent in the industry. Typically, information is printed on these documents in magnetic ink which can be read both by the human eye and a computer. This form of printing is read by a process called magnetic ink character recognition (MICR). As part of the recognition process, a MICR magnetic read head is used to read the information printed on the document.

Conventional approaches to MICR reading and recognition generally involve determining peak position information for a waveform generated by a single gap magnetic read head. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006 (formerly published as X9.27) "Print and Test Specifications for Magnetic Ink Printing (MICR)" as published by Accredited Standards Committee X9, Inc., Annapolis, Md., United States. Based on the design of the standard E-13B character set, in order that a MICR reader reliably read with a high correct character read rate and with a very low substitution rate, the document velocity must be precisely known during reading or otherwise be speed-controlled so that it does not vary.

These conventional approaches are acceptable when the velocity of the document is either known or can be controlled. In fact, conventional approaches to MICR typically involve rather complex schemes for controlling the velocity of the document or attempting to measure its velocity at different times as the document moves past the MICR read head. There has also been an approach to MICR reading and recognition that utilizes a dual gap read head to eliminate the need for precise knowledge or control of the document velocity.

In a hand-operated document reader/imager, the document is placed on a base and the MICR/image device is moved over the document from right to left, which is the traditional direction of larger document readers. During this movement, the MICR characters are recognized and the front image of the document is captured.

In more detail, the operational sequence of a manually operated linear check or document scanning device is as follows. A check or document is positioned on the bed of the device. The module that holds the contact image sensor and the magnetic read head is moved across the check or document, with the module being guided by a linear rod. The magnetic read head reads the MICR code line at the bottom of the document, and the contact image sensor scans the document. Data from both devices are passed to the electronics of the system for processing.

In order for the image sensor and magnetic read head to properly read the check or document, the speed of the module must be known over the entire length of the item being scanned. The speed of the scan can be measured by any one of a number of speed measuring devices. The greater the variation of speed, the more sophisticated, and therefore more expensive, the electronics must be, as well as the greater the chance of error.

The contact image sensor has a maximum speed limit, beyond which it will fail to operate properly. And, the MICR reader has a minimum speed limit, below which it cannot reliably operate. Accordingly, the speed of the scan must remain between these limits.

A motorized system can provide the required speed control, but is expensive. With a simple inexpensive manual operation, the scanning speed can and will vary from item to item, and over the length of the scan of a single item.

There is a 0.010 inch gap between the contact image sensor and the bed of the device. The check or document must be held firmly in place as the contact image sensor and magnetic read head are scanned over the document. If the check or document moves, an unusable image will result, such as a skewed image, and this situation will negatively impact the processing flow. Document movement during scanning tends to occur with checks or documents that have folds, creases, dog ears, or other mutilations. In general, any portion of the document that sits higher than the 0.010 inch gap will create friction against the contact image sensor and result in check or document movement.

The MICR read head is actually in contact with the document during scanning, and this friction also may skew the check or document, resulting in misreads and/or no reading of the MICR code line.

In existing document handling equipment, the only way that the check or document may be restrained is by any number of conventional clamping methods that restrain the document from both sides; however, in a scanning/reading system, the side of the document being scanned needs to be unobstructed.

For the foregoing reasons, there is a need for an improved method and system for providing controlled and repeatable motion in a non-motorized hand-operated reader/imager as well as providing document retention wherein the side of the document being scanned is not obstructed.

SUMMARY OF INVENTION

It is an object of the invention to provide an improved hand-operated document reader/imager with controlled and repeatable motion in a non-motorized system and with a document retention device including manually-powered anti-skew methodology.

According to the invention, a hand-operated document processor comprises a base for receiving a document containing magnetic ink character data to be read and recognized, and a moving magnetic ink character recognition (MICR) subsystem. The subsystem includes a MICR read head and is attached to the base such that movement of the subsystem causes the MICR read head to pass over the magnetic ink character data on the document. MICR reading and recognition logic receives the signal from the MICR read head.

The moving MICR subsystem may further include an image sensor that passes over the document as the MICR read head passes over the magnetic ink character data on the document.

The invention comprehends a speed limiting device for providing controlled and repeatable motion of the MICR subsystem. The speed limiting device also functions as a document positioning and retentioning device.

In one implementation, the bed or base of the reader/imager includes a high friction surface/perforated bed, and the reader/imager further includes a hand-cocked, spring-driven vacuum solenoid or diaphragm. In operation, the check or document is positioned on the perforated bed. At the start of the scanning operation, the operator releases the spring-driven vacuum solenoid or vacuum diaphragm which is packaged under the bed and had been manually cocked prior to the start of the scan by sliding the scan module to the ready position.

The vacuum solenoid or diaphragm creates a vacuum which is ducted to a chamber under the perforated bed. The vacuum acting through the perforations in the bed, and the Bernoulli effect due to airflow direction, securely holds the check or document during scanning and reading operations.

The spring that drives the vacuum solenoid, in accordance with this implementation of the invention, drives the MICR subsystem or scan module over the document. For example, a belt and pulley system may be used to drive the scan module with the spring force. Advantageously, this retention methodology in a hand-operated system eliminates skew and securely retains the checks or documents using the same manually cocked spring mechanism that drives the scan module.

The vacuum solenoid or diaphragm is preferably sized to maintain this vacuum over the maximum time required to scan the largest allowed document, while also acting as a brake to control the scan speed. The uncovered perforations in the high friction bed provide a path to bleed off the vacuum. Since the vacuum bleed off through the perforations is regulated by the size of the check and the percentage of perforations exposed, a second bleed path is supplied that allows the operator to adjust the orifice size to compensate for the check size. In this way, a bleed off rate for the vacuum solenoid may be made constant, regardless of check size, by appropriately adjusting the orifice size for the second bleed path, thereby attempting to maintain a constant scan rate in all cases.

DETAILED DESCRIPTION OF THE PREFERRED EMBODIMENTS

The E-13B character set contains ten characters and four symbols as defined in the ANS X9.100-20-2006 (formerly published as X9.27) "Print and Test Specifications for Magnetic Ink Printing (MICR)" as published by Accredited Standards Committee X9, Inc., Annapolis, Md., United States. When used on a document for automated machine reading, the characters and symbols in the set must be printed using magnetic ink. ANS X9.100-20-2006 defines the dimensions of each character/symbol and the expected nominal waveform peak position and relative amplitude of waveform peaks.

Figure 1:
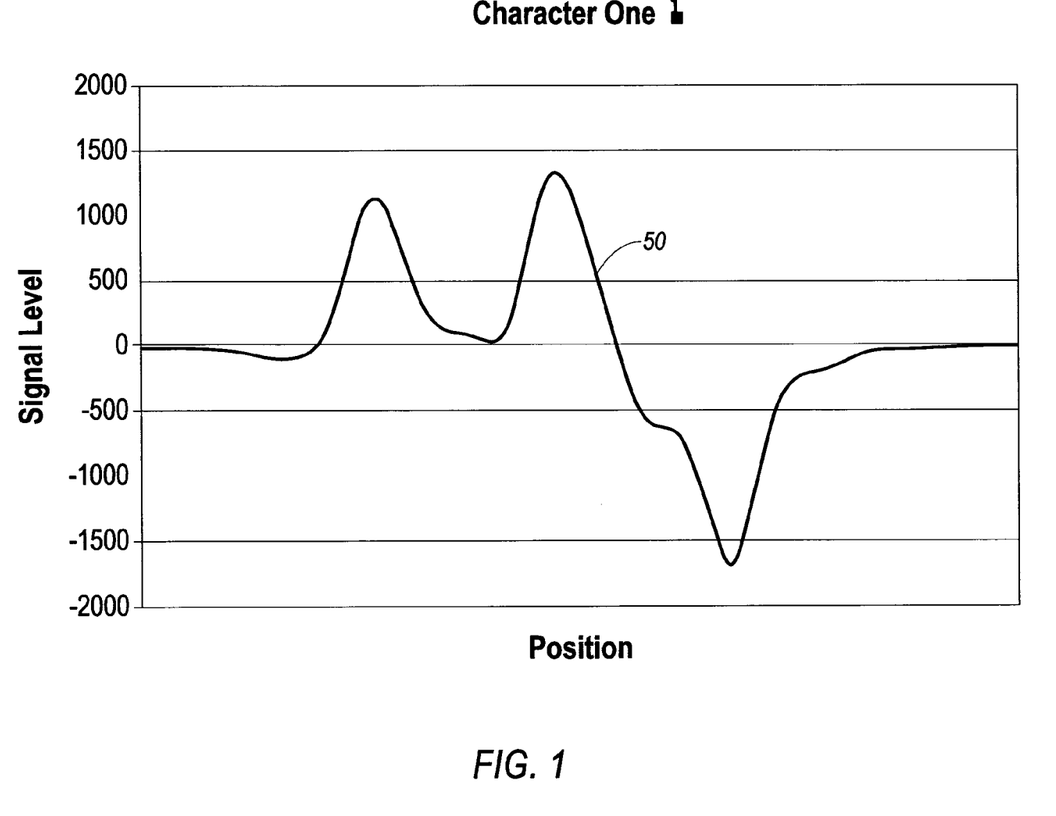
FIG. 1 shows the waveform for the magnetic ink character one, from the E-13B MICR character set as used on many financial payment documents, as read from a responsive magnetic signal gap read head when the magnetized character is passed by the magnetic read head.

FIG. 1 shows the waveform for the magnetic ink character one, from the E-13B MICR character set, as read from a responsive magnetic signal gap read head when the magnetized character is passed by the magnetic read head. The waveform is indicated at 50. As illustrated, the x-axis represents the position of the read head, and the y-axis represents the signal level.

MICR reading and recognition generally involves determining peak position information for a waveform generated by a single gap magnetic read head that passes over the magnetic ink characters on a document. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006.

Figure 2:
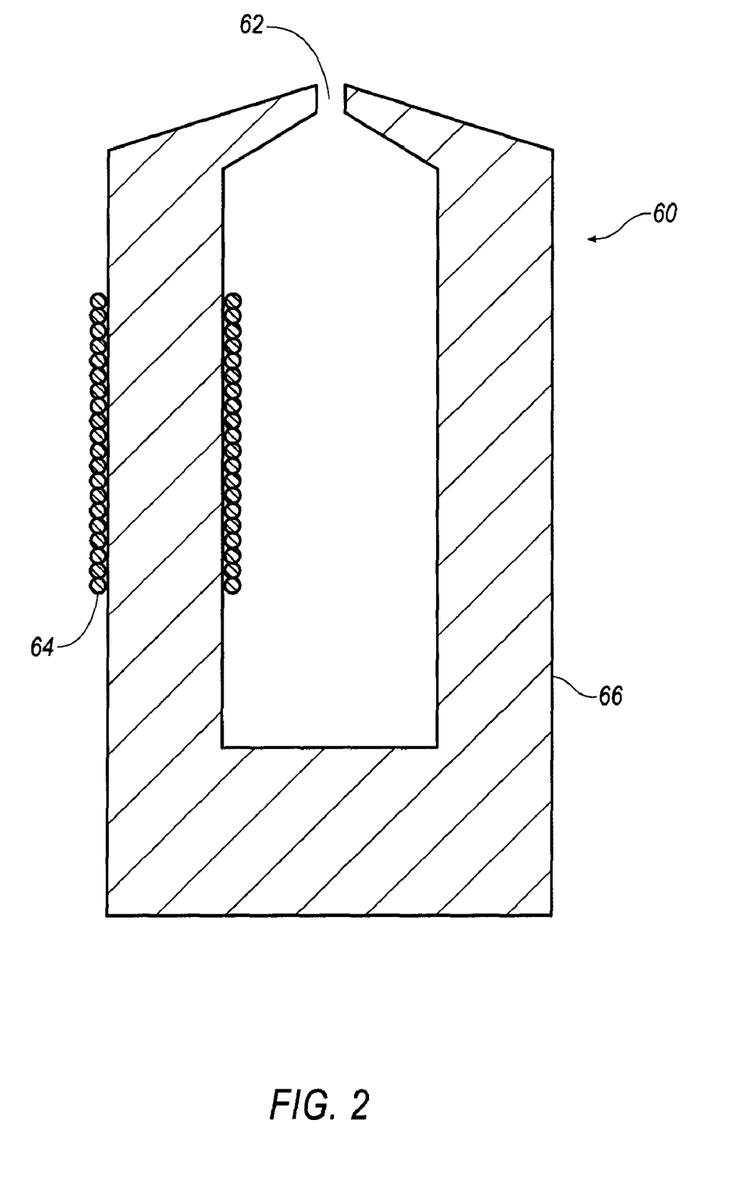
FIG. 2 is a cross-section view of a read head, which is one example of a suitable read head for reading magnetic ink characters.

In FIG. 2, a read head is generally indicated at 60, and includes a gap 62. The read head utilizes sensing coil 64. Core 66 forms a path for the magnetic flux changes experienced when the reader passes over magnetic ink. Of course, it is appreciated that alternative readers may be used, and any suitable technique may be utilized for assuring that flux variation from the magnetic ink characters is sensed.

Figure 3:
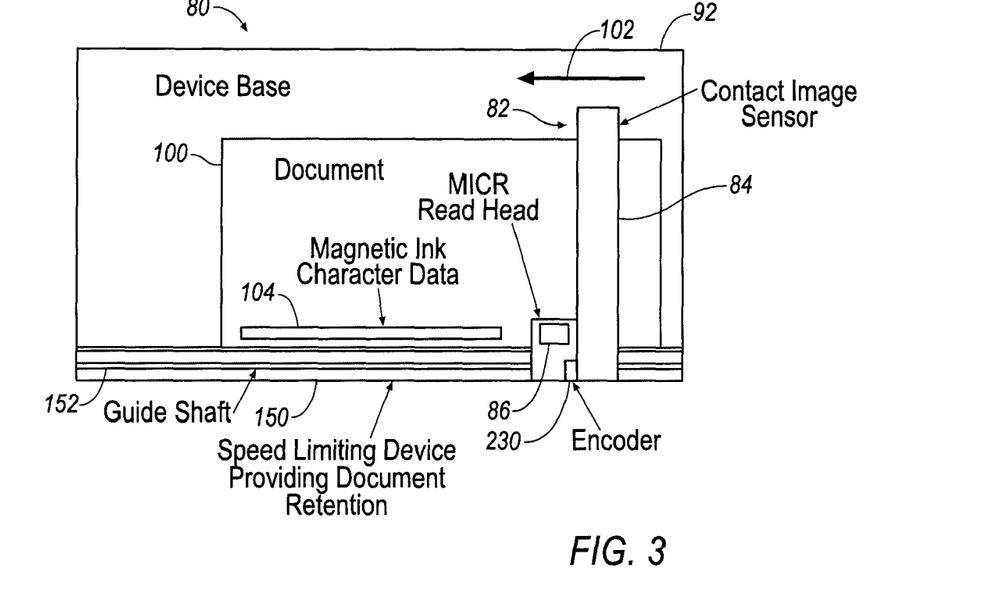
FIG. 3 illustrates a top view of a hand-operated document reader/imager made in accordance with the invention.

An exemplary embodiment of the invention is illustrated in FIGS. 3-7. As best shown in FIG. 3, a document reader/imager 80 includes a moving MICR/image subsystem 82. Subsystem 82 includes a contact image sensor 84, and a MICR read head 86. Contact image sensor 84 captures an image of the document 100 when subsystem 82 is moved across the document 100. Contact image sensor 84 captures the front image of the document 100 when the document 100 is placed face-up on the base 92 of the reader/imager 80 and the MICR/image subsystem 82 is moved from right to left over document 100 as indicated by arrow 102.

MICR read head 86 is for reading the magnetic ink character data 104 on document 100. During the front image capture, the MICR code line is read according to a traditional MICR algorithm as MICR read head 86 passes from right to left over the magnetic ink character data 104 on document 100.

With continuing reference to FIGS. 3-6, moving MICR/image subsystem 82 rides along a linear guide shaft 152 and holds the contact image sensor 84 and the magnetic read, head 86. The magnetic read head 86 reads the MICR code line 104 at the bottom of the document 100, and the contact image sensor 84 scans the document 100.

Figure 4:
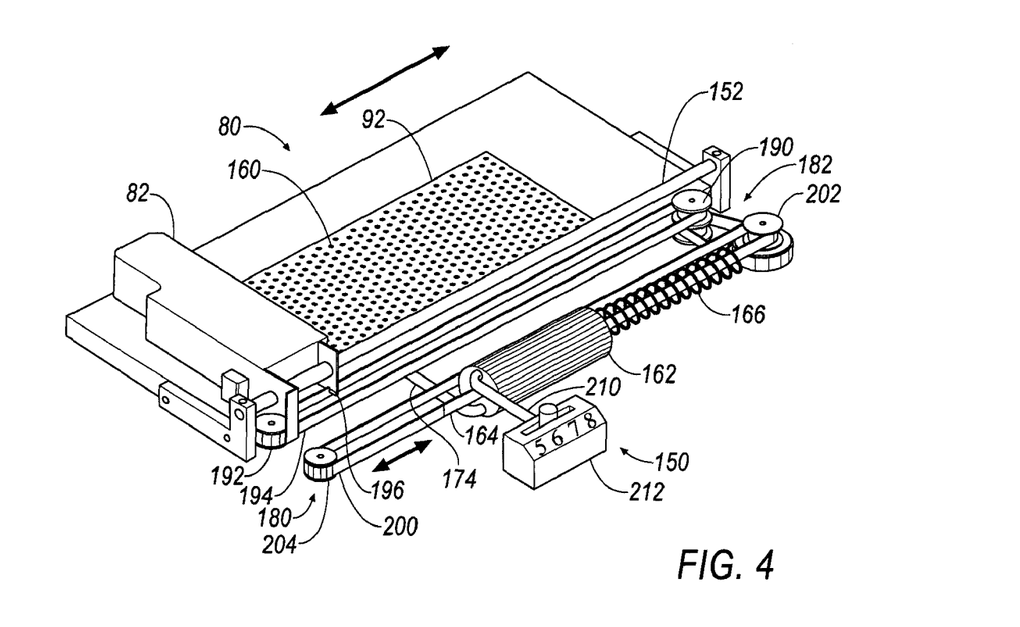
FIG. 4 illustrates a schematic diagram depicting the speed limiting and document retention device in an exemplary embodiment, with the document processor bed empty.

In operation, the MICR/image subsystem 82 is originally at the end position as depicted in FIG. 4. The operator slides the MICR subsystem 82 to the start or ready position as depicted in FIG. 5, and a document 100 is positioned on the base 92 of the hand-operated reader/imager 80.

A speed limiting and document retention mechanism 150 includes manually-powered anti-skew methodology. As shown in FIGS. 4-6, the base 92 of the document reader/imager 80 includes a high friction surface. Further, base 92 includes a perforated bed 160. A hand-cocked, spring-driven vacuum solenoid or diaphragm assembly includes vacuum solenoid 162, actuating rod 164, and actuation driving spring 166.

Figure 5:
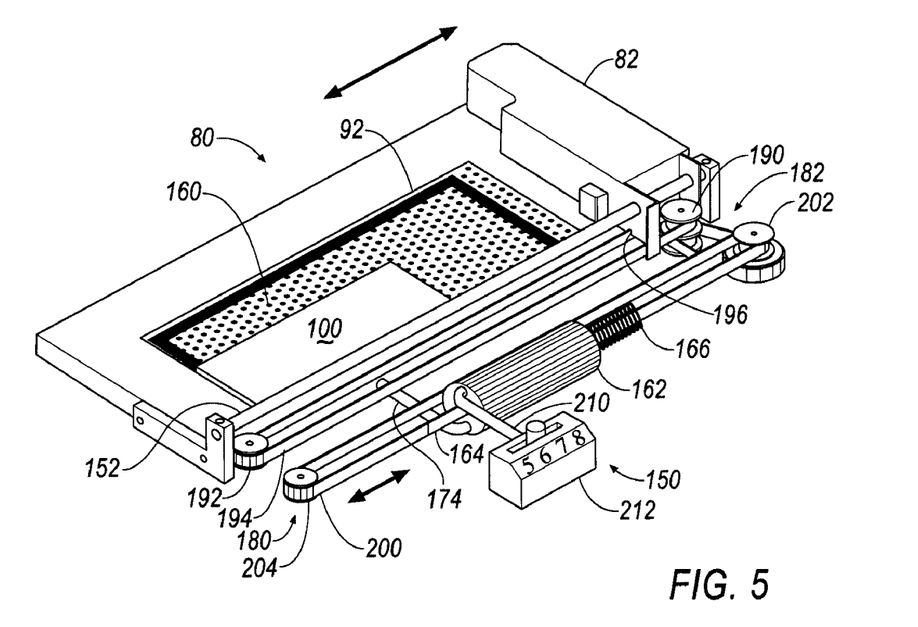
FIG. 5 illustrates a schematic diagram depicting the speed limiting and document retention device in the exemplary embodiment, with a small document positioned on the document processor bed.
Figure 6:
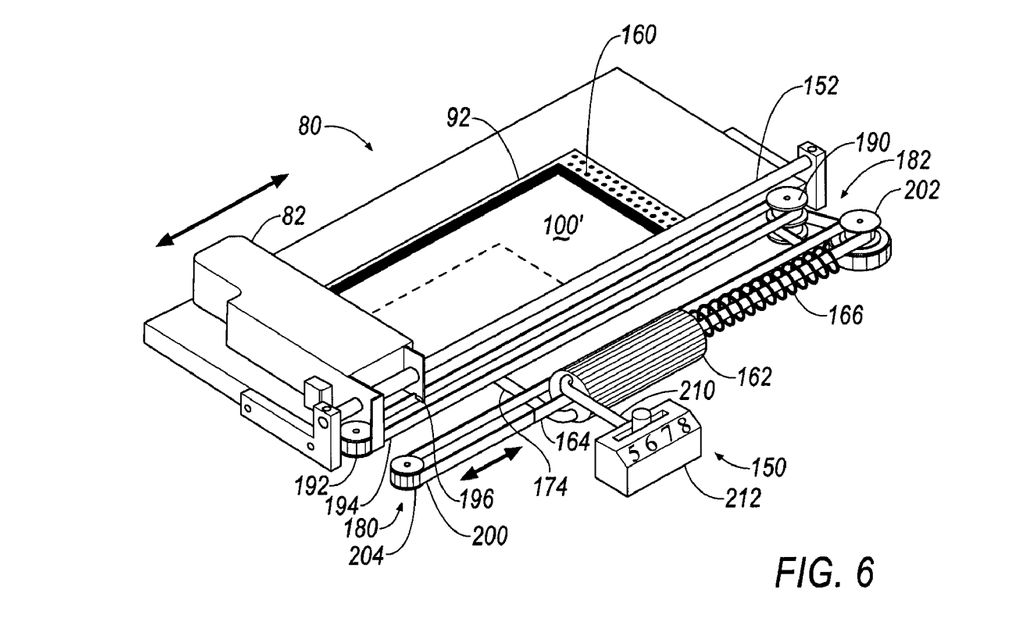
FIG. 6 illustrates a schematic diagram depicting the speed limiting and document retention device in the exemplary embodiment, with a large document positioned on the document processor bed.
Figure 7:
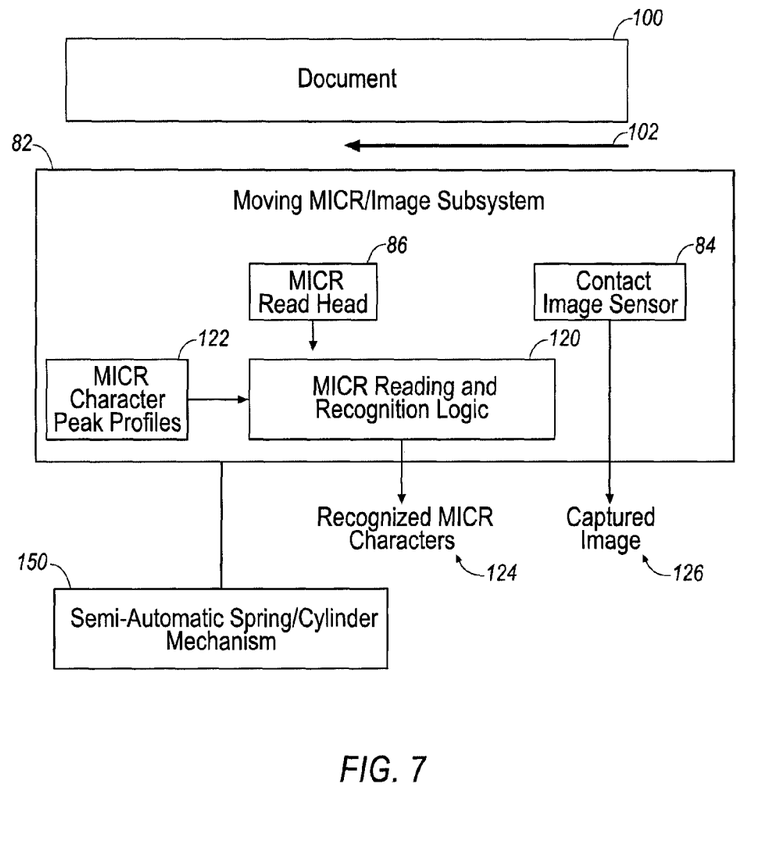
FIG. 7 is a block diagram illustrating a moving MICR/image subsystem including a speed limiting device providing document retention.

In operation, the check or document 100 is positioned on the perforated bed 160 as shown in FIG. 5. Sliding the scan module 82 to the ready position loads the spring 166. In more detail, spring 166 is arranged to drive the scan module 82 over the check or document 100 being processed. Mechanism 150 is connected by a belt and pulley system 180 to a belt and pulley speed reduction mechanism 182. Belt and pulley reduction mechanism 182 drives pulley 190. Pulley 190 is connected to pulley 192 by belt 194. MICR/image subsystem 82 is secured, at attachment member 196, to belt 194 such that mechanism 150 is able to drive the MICR/image subsystem 82.

Belt and pulley system 180 includes belt 200 and pulleys 202 and 204, holding belt 200. Solenoid actuating rod 164 extends through solenoid 162, and on each side of solenoid 162, is affixed to belt 200. Solenoid 162 is secured with respect to actuating rod 164. Speed reduction mechanism 182 allows travel of actuating rod 164 to be less than the travel of the MICR subsystem 82 to reduce the size and complexity of the assembly. In operation, with the MICR/image subsystem 82 at the start position (as depicted in FIG. 5), a document is positioned on the base 92 of the hand-operated reader/imager 80. Spring 166 is compressed due to the position of actuating rod 164. Releasing MICR subsystem 82 results in MICR subsystem 82 being driven by spring 166 across the length of the check or document being scanned and will drive rod 164 in the solenoid 162 at a rate that is directly proportional to the speed of the MICR subsystem 82.

The vacuum solenoid 162 creates a vacuum which is ducted by vacuum line 174 to a chamber under the perforated bed 160. The vacuum acting through the perforations in the bed 160, and the Bernoulli effect due to airflow direction, securely holds the check or document 100 during scanning and reading operations.

Advantageously, this retention methodology in a hand-operated system eliminates skew and securely retains the checks or documents using the same manually cocked spring mechanism that drives the scan module. The vacuum solenoid 162 is preferably sized to maintain this vacuum over the maximum time required to scan the largest allowed document, while also acting as a brake to control the scan speed. The uncovered perforations in the high friction bed 160 provide a path to bleed off the vacuum. Since the vacuum bleed off through the perforations is regulated by the size of the check and the percentage of perforations exposed, a second bleed path 210 is supplied that allows the operator to adjust the orifice size, with adjusting device 212, to compensate for the check size. For example, FIG. 5 depicts a small document 100 while FIG. 6 depicts a larger document 100', showing the size of the smaller document in dashed line for comparison. In this way, a bleed off rate for the vacuum solenoid 162 may be made constant, regardless of check size, by appropriately adjusting the orifice size for the second bleed path 210, thereby attempting to maintain a constant scan rate in all cases.

Typically, a signal indicative of the speed of the MICR subsystem 82 is provided to the MICR reading and recognition logic during the scan operation. In order for the image sensor and magnetic read head to properly read the check or document, the speed of the module must be known over the entire length of the item being scanned. The speed of the scan can be measured by any one of a number of speed measuring devices. The greater the variation of speed, the more sophisticated, and therefore more expensive, the electronics must be, as well as the greater the chance of error. A hand-operated document reader/imager requires a method of determining the position, and thus the speed, of the MICR and image sensors due to the variable speed nature of the manual operation. Existing solutions use optical encoders to provide this position feedback. Optical encoders are typically attached directly to the shaft of a wheel that moves along the document being scanned, or are connected to this shaft through a series of gears. For example, as shown in FIG. 3, a suitable encoder 230 measures the speed of the MICR subsystem. An output signal from encoder 230 is provided to the MICR reading and recognition logic during the scan operation.

Figure 8:
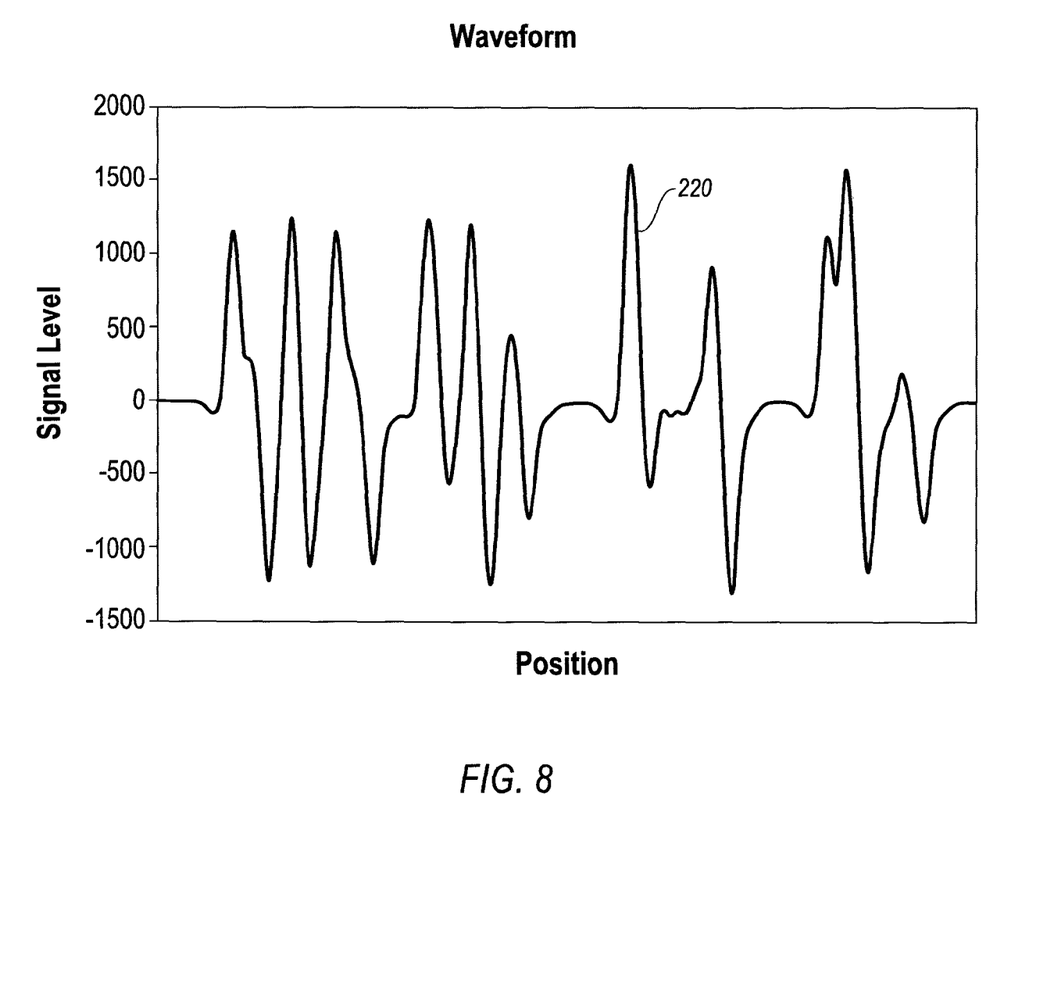
FIG. 8 illustrates a waveform for magnetic ink characters/symbols 3, 5, 7, Amount when the document containing the characters/symbols is inserted face up for front image capture in the hand-operated document reader/imager, and the magnetic ink characters/symbols are passed over from right to left.

FIG. 8 illustrates the moving MICR/image subsystem 82 in block diagram form, including the contact image sensor 84, MICR read head 86, and speed limiting device 150 which also provides document retention. As shown, the document 100 is placed on the base of the reader/imager for front image capture. Moving MICR/image subsystem 82 is moved across the document 100 as indicated by arrow 102. Block 120 represents the MICR reading and recognition logic. Logic 120 includes a traditional MICR algorithm as understood by one of ordinary skill in the art.

In the traditional MICR algorithm, the waveform obtained from the read head 86 is compared against known MICR character peak profiles 122. If the recognition is successful, the MICR reading and recognition logic 120 determines the recognized MICR characters 124. The traditional MICR algorithm is applied during the front image capture by contact image sensor 84 of a face-up document. The captured image is indicated at 126.

Logic 120 must be capable of determining the speed of the MICR and image sensors due to the variable nature of the manual operation. In accordance with the invention, device 150 retains the document 100 against the device bed while driving the scan module 82. Speed feedback to the MICR reading and recognition logic 120 may be provided in any suitable way.

FIG. 9 illustrates a waveform 220 for magnetic ink characters/symbols 3, 5, 7, Amount when the document containing the characters/symbols is inserted face up for front image capture in the hand-operated document reader/imager, and the magnetic ink characters/symbols are passed over from right to left. As illustrated, the x-axis represents the position of the read head, and the y-axis represents the signal level. The MICR reading and recognition logic is able to produce the waveform depicted at 220 based on the signal from the MICR read head and the speed feedback signal. In this way, the MICR reading and recognition logic can consider the MICR read head speed during reading and recognition. Consideration of MICR read head speed is required because speed variations affect the amount of time between the peaks of each character (as well as the amplitudes of the peaks due to the variation in the rate of change of the magnetic flux resulting from the variation in the read head speed). By considering the read head speed, the time information is able to be converted into distance information, which can be compared to the MICR character peak profiles as contained in ANS X9.100-20-2006.

In one implementation, in order to obtain optimal MICR results, the MICR read head signal is sampled at a resolution of 1,000 samples per inch. The sampling rate of the MICR subsystem is varied based on the sensed speed. For example, in order to achieve 1,000 samples per inch, a speed feedback mechanism commands the MICR sampling subsystem to sample every 0.001 inches. In the embodiment of the invention illustrated in FIGS. 3-7, this speed feedback is provided by the encoder 230. Similarly, speed feedback could be used to command the imaging subsystem to achieve a desired samples/inch resolution.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hand-operated document processor comprising:
a base for receiving a document containing magnetic ink character data to be read and recognized;
a manually operated moving magnetic ink character recognition (MICR) subsystem, the subsystem including a MICR read head and being attached to the base such that movement of the subsystem causes the MICR read head to pass over the magnetic ink character data on the document;
MICR reading and recognition logic receiving the signal from the MICR read head;
a spring for driving the moving MICR subsystem across the document being processed; and
a vacuum solenoid for creating a vacuum, the vacuum solenoid being driven by the spring and being connected to the base, wherein the created vacuum acts as a brake to control the speed of the moving MICR subsystem as the moving MICR subsystem is driven by the spring.

2. The hand-operated document processor of claim 1 wherein the base includes a perforated bed and the base defines a chamber under the perforated bed, and wherein the created vacuum is provided to the chamber under the perforated bed such that the vacuum, acting through the perforations, securely holds the document during the scanning operation.

3. The hand-operated document processor of claim 1 further comprising:
a belt and pulley arrangement including a belt connected to the MICR subsystem, the spring driving the belt to drive the moving MICR subsystem.

4. The hand-operated document processor of claim 1 wherein the vacuum solenoid is sized to maintain the vacuum over the maximum time required to scan a document that is the full size of the base.

5. The hand-operated document processor of claim 1 further comprising:
an encoder providing speed feedback information as the MICR read head passes over the magnetic ink character data on the document, the MICR reading and recognition logic further receiving the speed feedback information for use during character data recognition.

6. The hand-operated document processor of claim 1 wherein the moving MICR subsystem further comprises:
an image sensor that passes over the document as the MICR read head passes over the magnetic ink character data on the document.

7. The hand-operated document processor of claim 1 further comprising:
a linear guide shaft engaging the moving MICR subsystem for guiding the motion of the moving MICR subsystem.

8. The hand-operated document processor of claim 1 further comprising:
a belt and pulley arrangement including a belt connected to the MICR subsystem;
a speed reduction mechanism; and
wherein the spring and vacuum solenoid are connected through the speed reduction mechanism to drive the MICR subsystem.

9. The hand-operated document processor of claim 1 further comprising:
a second bleed path for the vacuum solenoid, wherein the created vacuum is further provided to the second bleed path.

10. The hand-operated document processor of claim 9 further comprising:
an orifice adjusting device for allowing the operator to adjust the second bleed path to compensate for check size.

11. A hand-operated document processor comprising:
a base including a perforated bed for receiving a document containing magnetic ink character data to be read and recognized, the base defining a chamber under the perforated bed;
a manually operated moving magnetic ink character recognition (MICR) subsystem, the subsystem including a MICR read head and being attached to the base such that movement of the subsystem causes the MICR read head to pass over the magnetic ink character data on the document;
an image sensor that passes over the document as the MICR read head passes over the magnetic ink character data on the document;
MICR reading and recognition logic receiving the signal from the MICR read head;
a spring for driving the moving MICR subsystem across the document being processed; and
a vacuum solenoid for creating a vacuum, the vacuum solenoid being driven by the spring and being connected to the base, wherein the created vacuum acts as a brake to control the speed of the moving MICR subsystem as the moving MICR subsystem is driven by the spring; and wherein the created vacuum is provided to the chamber under the perforated bed such that the vacuum, acting through the perforations, securely holds the document during the scanning operation.

12. The hand-operated document processor of claim 11 further comprising:

a belt and pulley arrangement including a belt connected to the MICR subsystem, the spring driving the belt to drive the moving MICR subsystem.

13. The hand-operated document processor of claim 11 wherein the vacuum solenoid is sized to maintain the vacuum over the maximum time required to scan a document that is the full size of the base.

14. The hand-operated document processor of claim 11 further comprising:

an encoder providing speed feedback information as the MICR read head passes over the magnetic ink character data on the document, the MICR reading and recognition logic further receiving the speed feedback information for use during character data recognition.

15. The hand-operated document processor of claim 11 further comprising:

a linear guide shaft engaging the moving MICR subsystem for guiding the motion of the moving MICR subsystem.

16. The hand-operated document processor of claim 11 further comprising:

a belt and pulley arrangement including a belt connected to the MICR subsystem;

a speed reduction mechanism; and wherein the spring and vacuum solenoid are connected through the speed reduction mechanism to drive the MICR subsystem.

17. The hand-operated document processor of claim 11 further comprising:

a second bleed path for the vacuum solenoid, wherein the created vacuum is further provided to the second bleed path.

18. The hand-operated document processor of claim 17 further comprising:

an orifice adjusting device for allowing the operator to adjust the second bleed path to compensate for check size.

19. A hand-operated document processor comprising:

a base including a perforated bed for receiving a document containing magnetic ink character data to be read and recognized, the base defining a chamber under the perforated bed;

a manually operated moving magnetic ink character recognition (MICR) subsystem, the subsystem including a MICR read head and being attached to the base such that movement of the subsystem causes the MICR read head to pass over the magnetic ink character data on the document;

MICR reading and recognition logic receiving the signal from the MICR read head;

a spring for driving the moving MICR subsystem across the document being processed; and a vacuum solenoid for creating a vacuum, the vacuum solenoid being driven by the spring and being connected to the base, wherein the created vacuum acts as a brake to control the speed of the moving MICR subsystem as the moving MICR subsystem is driven by the spring;

wherein the created vacuum is provided to the chamber under the perforated bed such that the vacuum, acting through the perforations, securely holds the document during the scanning operation; and a second bleed path for the vacuum solenoid, wherein the created vacuum is further provided to the second bleed path.

20. The hand-operated document processor of claim 19 further comprising:

an orifice adjusting device for allowing the operator to adjust the second bleed path to compensate for check size.

* * * * *